US010868750B1

(12) United States Patent
Yang et al.

(10) Patent No.: US 10,868,750 B1
(45) Date of Patent: Dec. 15, 2020

(54) METHOD AND DEVICE FOR FACILITATING DELIVERY OF CONTENT IN A MULTI-ACCESS EDGE COMPUTING (MEC) ENVIRONMENT

(71) Applicant: Verizon Patent and Licensing Inc., Arlington, VA (US)

(72) Inventors: Jin Yang, Orinda, CA (US); Sagiv Draznin, Walnut Creek, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/536,989

(22) Filed: Aug. 9, 2019

(51) Int. Cl.
*H04L 12/26* (2006.01)
*H04L 29/06* (2006.01)
*H04L 29/08* (2006.01)

(52) U.S. Cl.
CPC ............ *H04L 43/16* (2013.01); *H04L 43/08* (2013.01); *H04L 65/4076* (2013.01); *H04L 67/10* (2013.01)

(58) Field of Classification Search
None
See application file for complete search history.

(56) References Cited

U.S. PATENT DOCUMENTS

| 10,575,220 | B2* | 2/2020 | Lee | H04W 36/0011 |
|---|---|---|---|---|
| 10,659,397 | B2* | 5/2020 | Jeong | H04W 28/14 |
| 2009/0323575 | A1* | 12/2009 | Li | H04L 12/1886 370/312 |
| 2015/0003242 | A1* | 1/2015 | Han | H04W 28/0268 370/230 |
| 2015/0222491 | A1* | 8/2015 | Clark | H04L 45/48 370/256 |
| 2015/0288619 | A1* | 10/2015 | Fritsch | H04L 41/5025 709/224 |
| 2016/0337411 | A1* | 11/2016 | Glasser | H04L 47/15 |
| 2017/0085610 | A1* | 3/2017 | Nakagawa | H04L 12/18 |
| 2017/0201571 | A1* | 7/2017 | Sherf | H04L 43/0817 |
| 2018/0083886 | A1* | 3/2018 | Peitzer | H04N 21/64746 |
| 2018/0173557 | A1* | 6/2018 | Nakil | H04L 41/0631 |
| 2018/0367604 | A1* | 12/2018 | Kodaypak | H04L 65/4084 |
| 2019/0044852 | A1* | 2/2019 | Nolan | H04L 45/502 |
| 2019/0158606 | A1* | 5/2019 | Guim Bernat | H04W 4/40 |
| 2019/0278631 | A1* | 9/2019 | Guim Bernat | G06F 9/5011 |
| 2019/0320324 | A1* | 10/2019 | Guan | H04W 24/02 |
| 2020/0236067 | A1* | 7/2020 | Jeong | H04W 28/0278 |

* cited by examiner

*Primary Examiner* — Joshua Joo

(57) ABSTRACT

An edge device may obtain, via a base station, one or more respective requests from one or more user devices to access content. The edge device may determine a total number of the one or more user devices and may determine that the total number of the one or more user devices satisfies a threshold. The edge device may determine, based on the total number of the one or more user devices satisfying the threshold, a latency requirement associated with the content and may determine whether the edge device can satisfy the latency requirement. The edge device may selectively cause, based on determining whether the edge device can satisfy the latency requirement, the edge device or a different edge device to send the content to the one or more user devices via the base station.

20 Claims, 13 Drawing Sheets

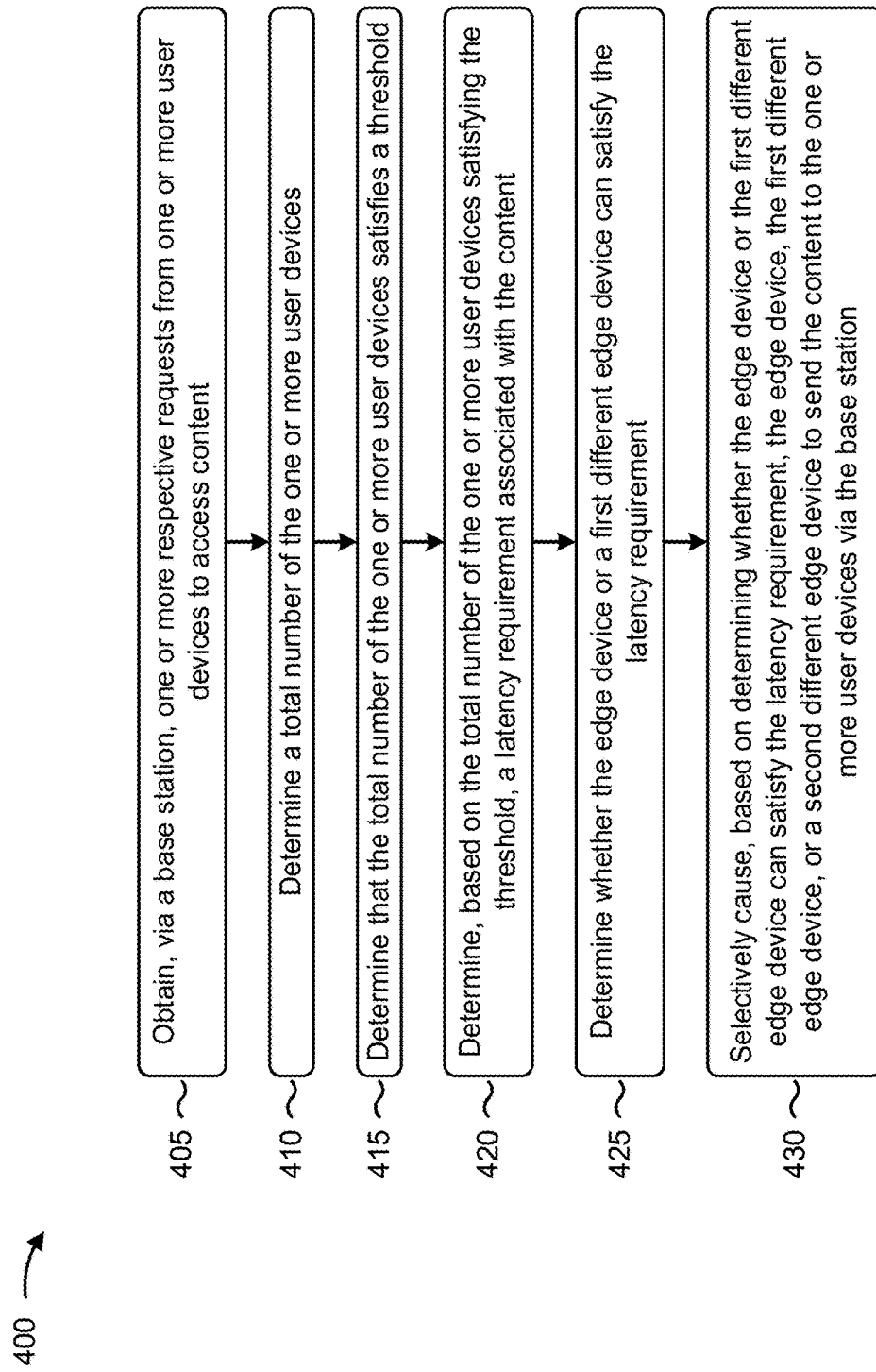

METHOD AND DEVICE FOR FACILITATING DELIVERY OF CONTENT IN A MULTI-ACCESS EDGE COMPUTING (MEC) ENVIRONMENT

BACKGROUND

In a multi-access edge computing (MEC) environment, computing is enabled by a network architecture that provides computing capabilities, to a user device, via computing devices at or near an edge of a network (e.g., a wireless communication network). Accordingly, because a MEC environment may provide computing at or near the edge of the network, increased performance may be achieved over networks that may be topologically and/or physically farther or outside the providers network from a user device than a MEC environment. Such increased performance may be achieved in the MEC environment due to less traffic and/or congestion between a user device and the computing platform, less latency (due to the closer proximity), increased flexibility (due to a greater amount of computing platforms), resource availability, and/or the like.

BRIEF DESCRIPTION OF THE DRAWINGS

FIG. 4 is a flow chart of an example process for facilitating delivery of multicast or broadcast content in a multi-access edge computing (MEC) environment.

DETAILED DESCRIPTION OF PREFERRED EMBODIMENTS

Figure 1A:
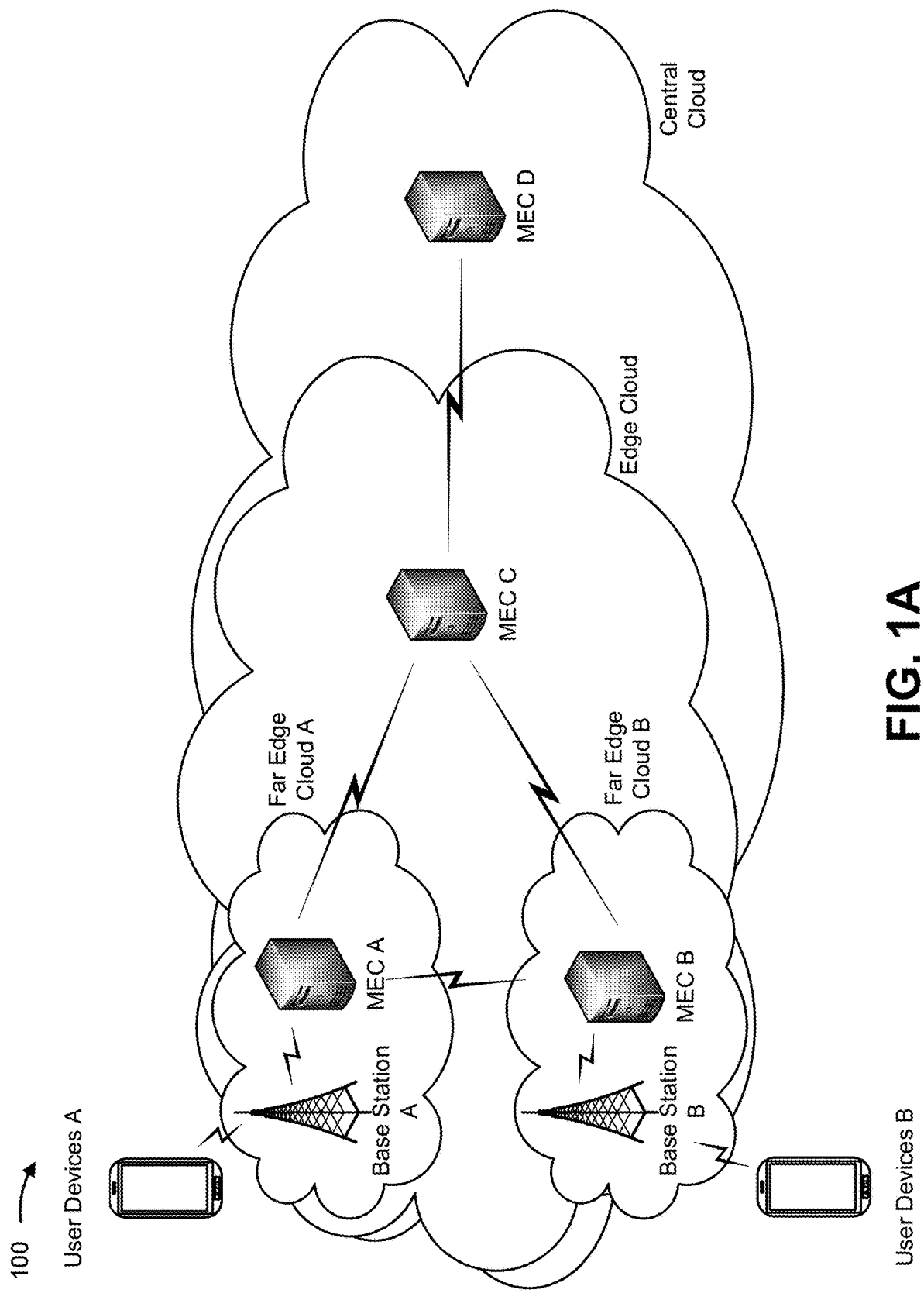
FIGS. 1A-1J are diagrams of one or more example implementations described herein.

The following detailed description of example implementations refers to the accompanying drawings. The same reference numbers in different drawings may identify the same or similar elements.

In some instances, one or more user devices may request access to multicast or broadcast content (e.g., content) from a cloud environment. The cloud environment may be a multi-access edge computing (MEC) environment that includes multiple cloud levels, such as central cloud, an edge cloud, and a far edge cloud. In many cases, content may be hosted by MEC devices associated with the far edge cloud and/or the edge cloud to reduce latency associated with delivering the content to the one or more user devices. However, some types of content are not as latency sensitive (e.g., streaming video) as other types of content (e.g., augmented reality (AR) applications and/or virtual reality (VR) applications). So, utilizing far edge cloud and/or edge cloud resources for less latency sensitive types of content may be an inefficient use of resources.

Some implementations described herein provide an edge device (e.g., a MEC device) that determines which edge device, of multiple edge devices, is an optimal edge device to deliver multicast or broadcast content to one or more user devices. In some implementations, the edge device obtains, via a base station, one or more respective requests from one or more user devices to access the content. In some implementations, the edge device determines a total number of the one or more user devices and determines that the total number of the one or more user devices satisfies a threshold. In some implementations, the edge device determines, based on the total number of the one or more user devices satisfying the threshold, a latency requirement associated with the content and determines whether the edge device can satisfy the latency requirement. In some implementations, the edge device may selectively cause, based on determining whether the edge device can satisfy the latency requirement, the edge device or a different edge device to send the content to the one or more user devices via the base station.

In this way, the edge device optimizes the use of cloud resources by ensuring that the edge device that can satisfy the latency requirement for delivering the content to the one or more user devices hosts the content. For example, some implementations described herein minimize unnecessary usage of resources associated with the far edge cloud and/or the edge cloud (e.g., because the content does not have a low latency requirement). As another example, some implementations described herein facilitate more efficient usage of cloud resources by enabling a MEC device to send the content as a multicast and/or broadcast transmission rather than as multiple unicast transmissions. Further, the MEC environment can be latency sensitive for delivering multicast or broadcast content to the one or more user devices. This enables the MEC environment to be structured in a way to allocate resources to the far edge cloud, the edge cloud, and/or the central cloud according to practical latency requirements associated with transmitting content, which can further optimize use of cloud resources.

FIGS. 1A-1J are diagrams of an example implementation 100 described herein. Example implementation 100 may include one or more user devices (e.g., shown as one or more user devices A and one or more user devices B in FIG. 1A), one or more base stations (e.g., shown as base station A and base station B in FIG. 1A), and/or one or more multi-access edge computing (MEC) devices (e.g., shown as MEC device A, MEC device B, MEC device C, and MEC device D in FIG. 1A). As shown in FIG. 1A, example implementation 100 may include one or more far edge clouds (shown in FIG. 1A as far edge cloud A and far edge cloud B), an edge cloud, and/or a central cloud. Far edge cloud A, far edge cloud B, the edge cloud, and the central cloud may be part of and/or associated with a wireless communication network, such as a third generation (3G) network, a long term evolution (LTE) network, a fifth generation (5G) network, and/or the like.

A cloud may represent a computing environment where a MEC device associated with the cloud may provide services (e.g., deploy applications, store and process content, and or the like) for one or more user devices. A cloud may provide services to one or more user devices within an area (e.g., a physical service area of one or more base stations and an associated MEC device). For example, a far edge cloud may provide services to one or more user devices associated with a single base station and a MEC device (e.g., where the base station and the MEC device are physically near each other to reduce latency associated with providing services). As shown in FIG. 1A, far edge cloud A may provide services to one or more user devices A associated with base station A and MEC device A (e.g., where the base station A and MEC device A are physically near each other). As further shown in FIG. 1B, far edge cloud B may provide services to one or more user devices B associated with base station B and MEC device B (e.g., where the base station B and MEC device B are physically near each other).

As another example, a central cloud may provide services to one or more user devices associated with one or more base stations and a MEC device (e.g., where the one or more base stations and the MEC device are physically far from each other). A central cloud may have a higher latency associated with providing services than a far edge cloud, but may have more resources (e.g., computational resources) to handle providing the services. As shown in FIG. 1A, the central cloud may provide services to one or more user devices A and B associated with base stations A and B and MEC device D (e.g., where the base stations A and B and MEC device D are physically far from each other).

In another example, an edge cloud may provide services to one or more user devices associated with one or more base stations and a MEC device (e.g., where the one or more base stations and the MEC device are physically farther from each other than in a far edge cloud but closer to each other than in central cloud). An edge cloud may have a higher latency associated with providing services than a far edge cloud, but a lower latency than a central cloud. As shown in FIG. 1A, the edge cloud may provide services to one or more user devices A and B associated with base stations A and B and MEC device C (e.g., where a physical distance between base station A and MEC device C is greater than a physical distance between base station A and MEC device A and less than a physical distance between base station A and MEC device D and/or a physical distance between base station B and MEC device C is greater than a physical distance between base station B and MEC device B and less than a physical distance between base station B and MEC device D).

Accordingly, base station A and/or MEC device A may be associated with far edge cloud A; base station B and/or MEC device B may be associated with far edge cloud B; base station A, base station B, and/or MEC device C may be associated with the edge cloud; base station A, base station B, and/or MEC device D may be associated with the central cloud; and/or the like. Further, base station A may be associated with MEC device A, MEC device C, MEC device D, and/or the like (e.g., base station A may directly communicate with MEC device A via far edge cloud A, MEC device C via the edge cloud, MEC device D via the central cloud, and/or the like). Base station B may be associated with MEC device B, MEC device C, MEC device D, and/or the like (e.g., base station B may directly communicate with MEC device B via far edge cloud B, MEC device C via the edge cloud, MEC device D via the central cloud, and/or the like).

In some implementations, the one or more user devices A may communicate with MEC device A, MEC device C, and/or MEC device D via base station A. The one or more user devices B may communicate with MEC device B, MEC device C, and/or MEC device D via base station B.

Figure 1B:
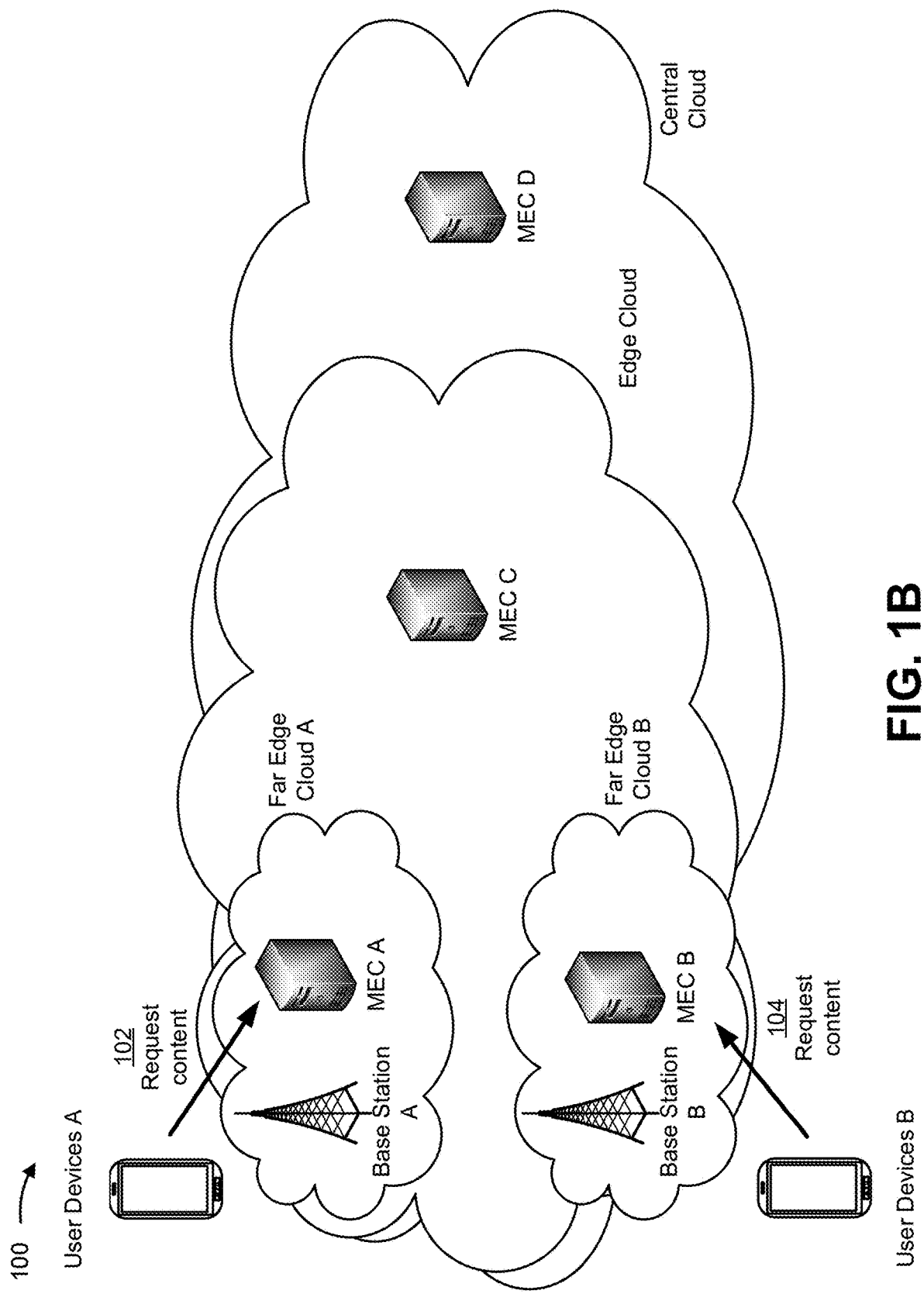

As shown in FIG. 1B and by reference number 102, the one or more user devices A may request access to content. For example, each user device of the one or more user devices A may send a request to access the content to MEC device A via base station A. In some implementations, MEC device A may obtain one or more respective requests from the one or more user devices A to access the content via base station A. The content may be multicast content or broadcast content (e.g., content to be delivered to one or more user devices simultaneously, such as a live video streaming of a sporting event, a public safety message, and/or the like). The content may be time synchronized content (e.g., content to be delivered in a time synchronized manner (e.g., with minimal to no latency) to one or more user devices (e.g., for augmented reality (AR) applications, virtual reality (VR) applications, and/or the like).

As shown by reference number 104, the one or more user devices B may request access to the content in a similar manner as the one or more user devices A. For example, each user device of the one or more user devices B may send a request to access the content to MEC device B via base station B. In some implementations, MEC device B may obtain one or more respective requests from the one or more user devices B to access the content via base station B.

Figure 1C:
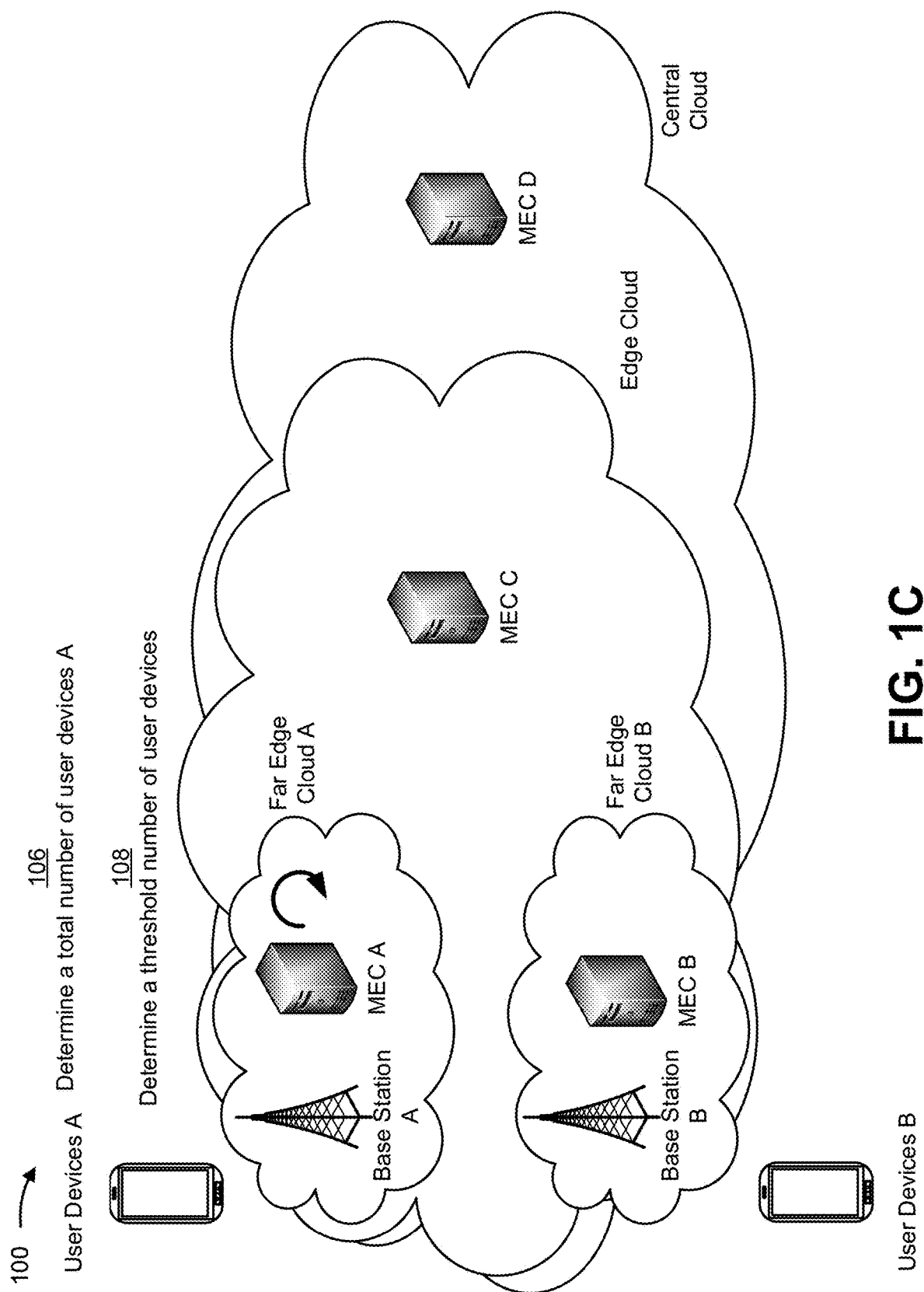

As shown in FIG. 1C and by reference number 106, MEC device A may determine a total number of the one or more user devices A. For example, MEC device A may determine a total number of the requests to access the content that MEC device A obtained from the one or more user devices A to determine the total number of the one or more user devices A. As shown by reference number 108, MEC device A may determine a threshold number of user devices. For example, MEC device A may determine a content hosting requirement of MEC device A and may determine the threshold based on the content hosting requirement of MEC device A. The content hosting requirement may indicate when MEC device A can host multicast or broadcast content. For example, the content hosting requirement may be a multicast or broadcast hosting efficiency requirement that defines when sending content to multiple user devices as a multicast or broadcast transmission is more suitable (e.g., based on consumption of processing resources, memory resources, power resources, networking resources, and/or the like of MEC device A) than sending the content to the multiple user devices as individual unicast transmissions.

Figure 1D:
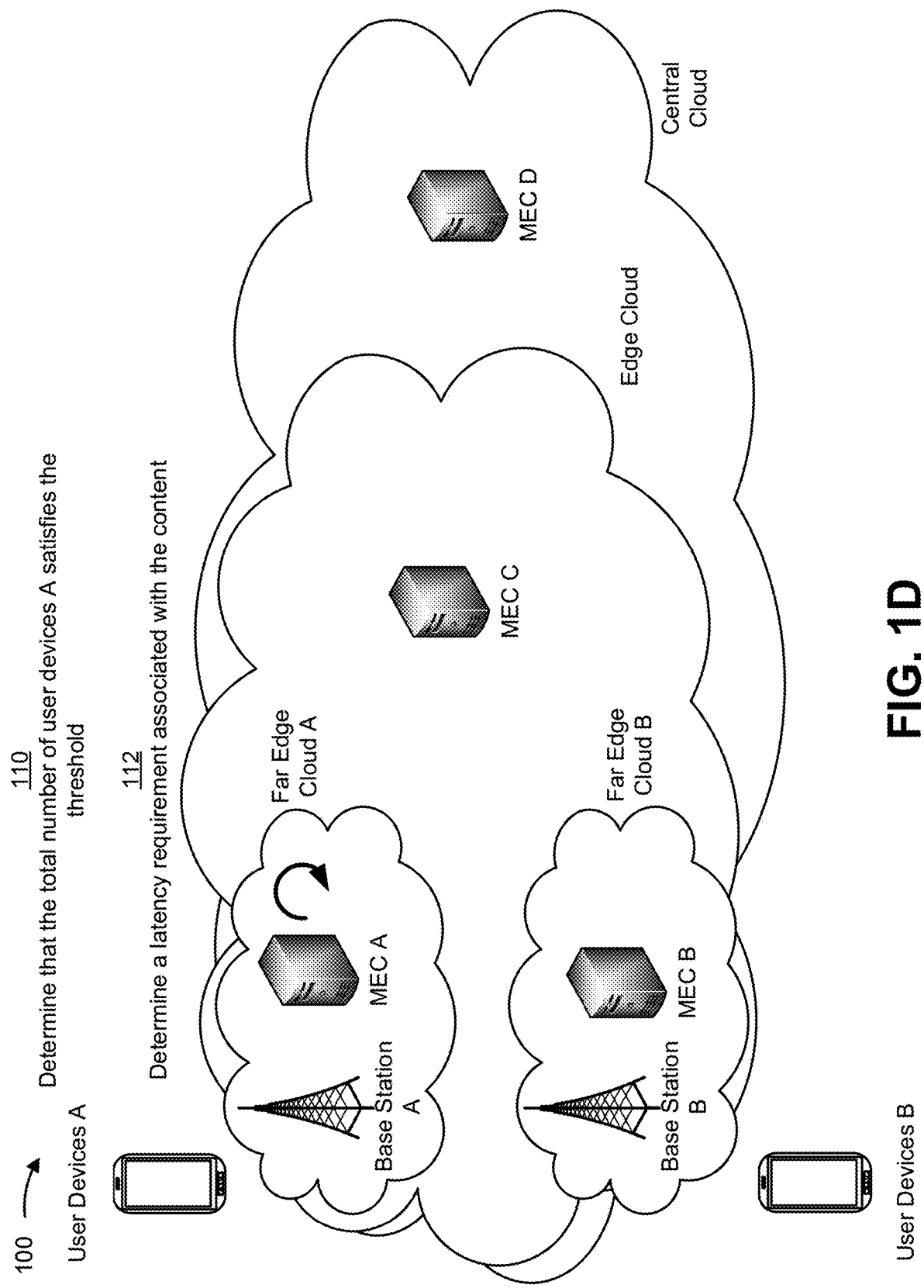

As shown in FIG. 1D and by reference number 110, MEC device A may determine that the total number of the one or more user devices A satisfies the threshold (e.g., the total number of the one or more user devices A is greater than or equal to the threshold). In some implementations, MEC device A may send, based on determining that the total number of the one or more user devices A satisfies the threshold, a message to one or more other MEC devices indicating that MEC device A is multicast or broadcast enabled (e.g., a message indicating that MEC device A can send the content to the one or more user devices A as a multicast or broadcast transmission). For example, MEC device A may send the message to MEC device B, MEC device C, and/or MEC device D.

As shown by reference number 112, MEC device A may determine a latency requirement associated with the content. The latency requirement may depend on the type of the content. For example, time synchronized content may have a first latency requirement (e.g., latency needs to be less than about 10 milliseconds). As another example, live streaming video content may have a second latency requirement (e.g., latency can be greater than or equal to about 10 milliseconds but needs to be less than about 500 milliseconds). In another example, public safety content may have a third latency requirement (e.g., latency can be greater than or equal to about 500 milliseconds, but needs to be less than about 1,000 milliseconds). The latency requirement may indicate a desired latency range defined by a lower latency value and/or an upper latency value (e.g., where the desired latency range is greater than or equal to the lower latency value and less than the upper latency value). For example, the first latency requirement may have a lower latency value of 0 and/or an upper latency value of about 10 milliseconds; the second latency requirement may have a lower latency value of about 10 milliseconds and/or an upper latency value of about 500 milliseconds; the third latency requirement may have a lower latency value of about 500 milliseconds and/or an upper latency value of about 1,000 milliseconds, and/or the like. In some implementations, MEC device A may determine the type of the content (e.g., by processing the content) and may determine, based on the type of the content, the latency requirement.

Figure 1E:
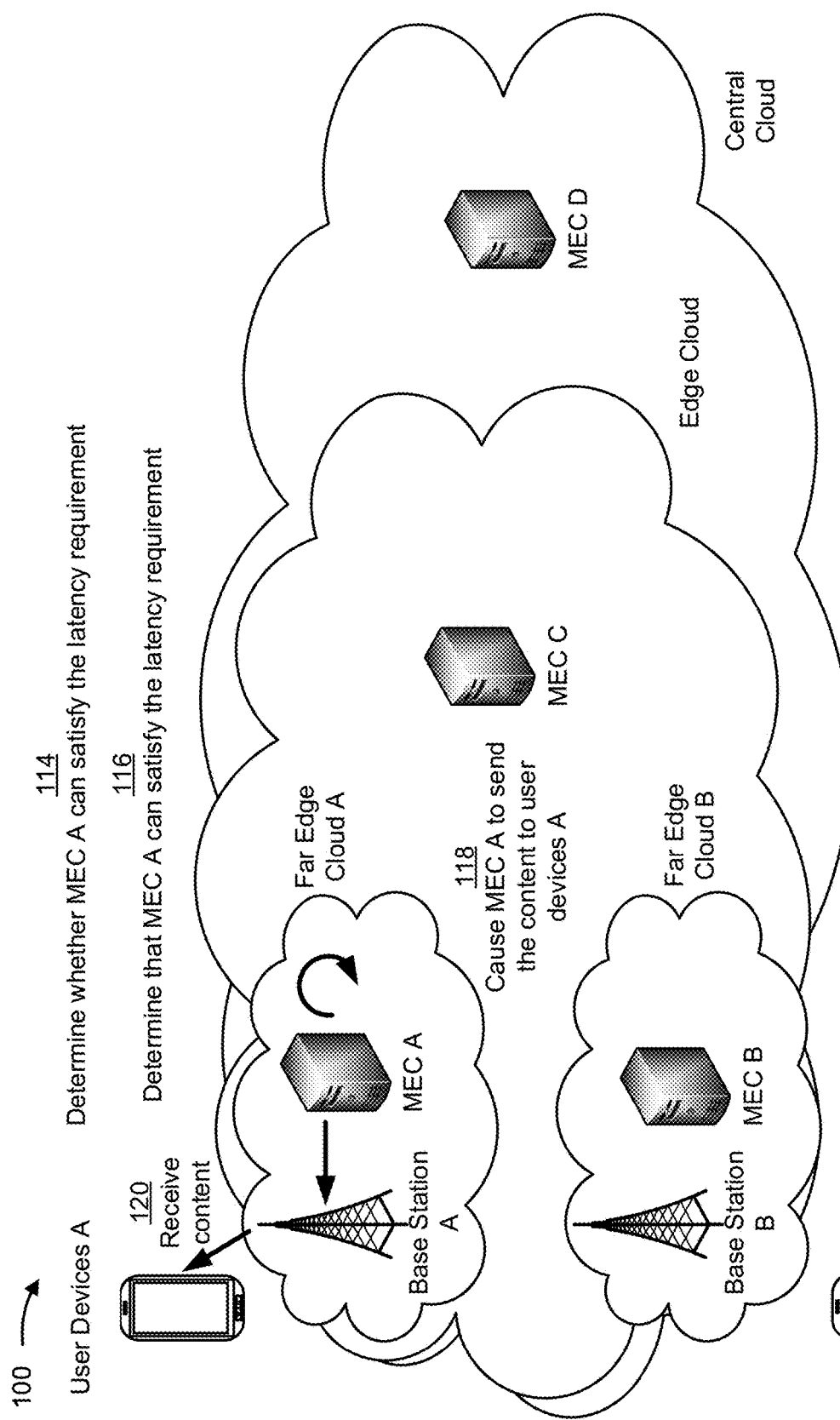

As shown in FIG. 1E and by reference number 114, MEC device A may determine whether MEC device A can satisfy the latency requirement. For example, MEC device A may determine whether MEC device A can send the content to the one or more user devices A such that the latency associated with sending the content to the one or more user devices A is greater than or equal to the lower latency value of the latency requirement and/or less than the upper latency value of the latency requirement. In some implementations, MEC device A can determine a latency capability of MEC device A and determine, based on the latency capability of MEC device A, whether MEC device A can satisfy the latency requirement. The latency capability may be based on a physical distance between MEC device A and base station A and/or the one or more user devices A. For example, the latency capability may indicate an estimated amount of time (or an estimated amount of time range) for the content to travel the distance to base station A and/or the one or more user devices A (e.g., an estimated amount of time for MEC device A to send the content to base station A and/or the one or more user devices A).

As shown by reference number 116, MEC device A may determine that MEC device A can satisfy the latency requirement. For example, MEC device A may determine that the latency capability of MEC device A is greater than or equal to the lower latency value of the latency requirement and/or less than the upper latency value of the latency requirement and that therefore MEC device A can satisfy the latency requirement.

As shown by reference number 118, MEC device A can cause MEC device A to send the content to the one or more user devices A. For example, MEC device A can cause MEC device A to host the content and/or send the content (e.g., as a multicast or broadcast transmission) to the one or more user devices A when MEC device A can satisfy the latency requirement. MEC device A may send the content to the one or more user devices A via base station A. As shown by reference number 120, the one or more user devices A may receive the content from MEC device A via base station A.

Additionally, or alternatively, MEC device A may determine that MEC device A cannot satisfy the latency requirement. For example, MEC device A may determine that the latency capability of MEC device A is less than the lower latency value of the latency requirement and that therefore MEC device A cannot satisfy the latency requirement.

Figure 1F:
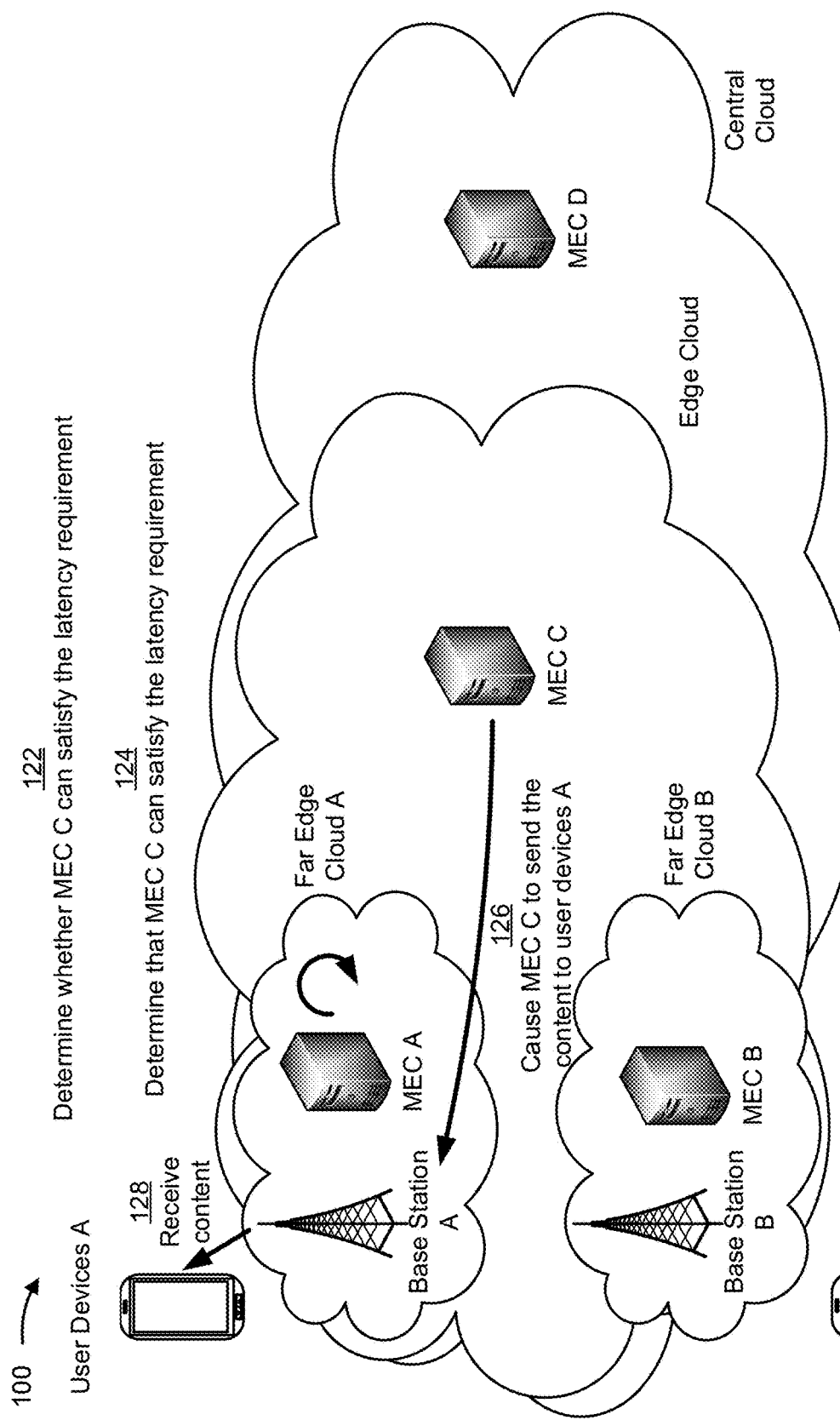

Accordingly, as shown in FIG. 1F and by reference number 122, MEC device A may determine whether MEC device C can satisfy the latency requirement. For example, MEC device A may determine a latency capability of MEC device C (e.g., by communicating with MEC device C) and may determine, based on the latency capability of MEC device C, whether MEC device C can satisfy the latency requirement in a similar manner as described herein in relation to MEC device A.

As shown by reference number 124, MEC device A may determine that MEC device C can satisfy the latency requirement. For example, MEC device A may determine that the latency capability of MEC device C is greater than or equal to the lower latency value of the latency requirement and/or less than the upper latency value of the latency requirement and that therefore MEC device C can satisfy the latency requirement.

As shown by reference number 126, MEC device A may cause MEC device C to send the content to the one or more user devices A. For example, MEC device A may cause MEC device C (e.g., by sending a message to MEC device C) to host the content and/or send the content (e.g., as a multicast or broadcast transmission) to the one or more user devices A when MEC device C can satisfy the latency requirement. MEC device C may send the content to the one or more user devices A via base station A. As shown by reference number 128, the one or more user devices A may receive the content from MEC device C via base station A.

Additionally, or alternatively, MEC device A may determine that MEC device C cannot satisfy the latency requirement. For example, MEC device A may determine that the latency capability of MEC device C is less than the lower latency value of the latency requirement and/or that the latency capability of MEC device C is greater than the upper latency value of the requirement and that therefore MEC device C cannot satisfy the latency requirement.

Figure 1G:
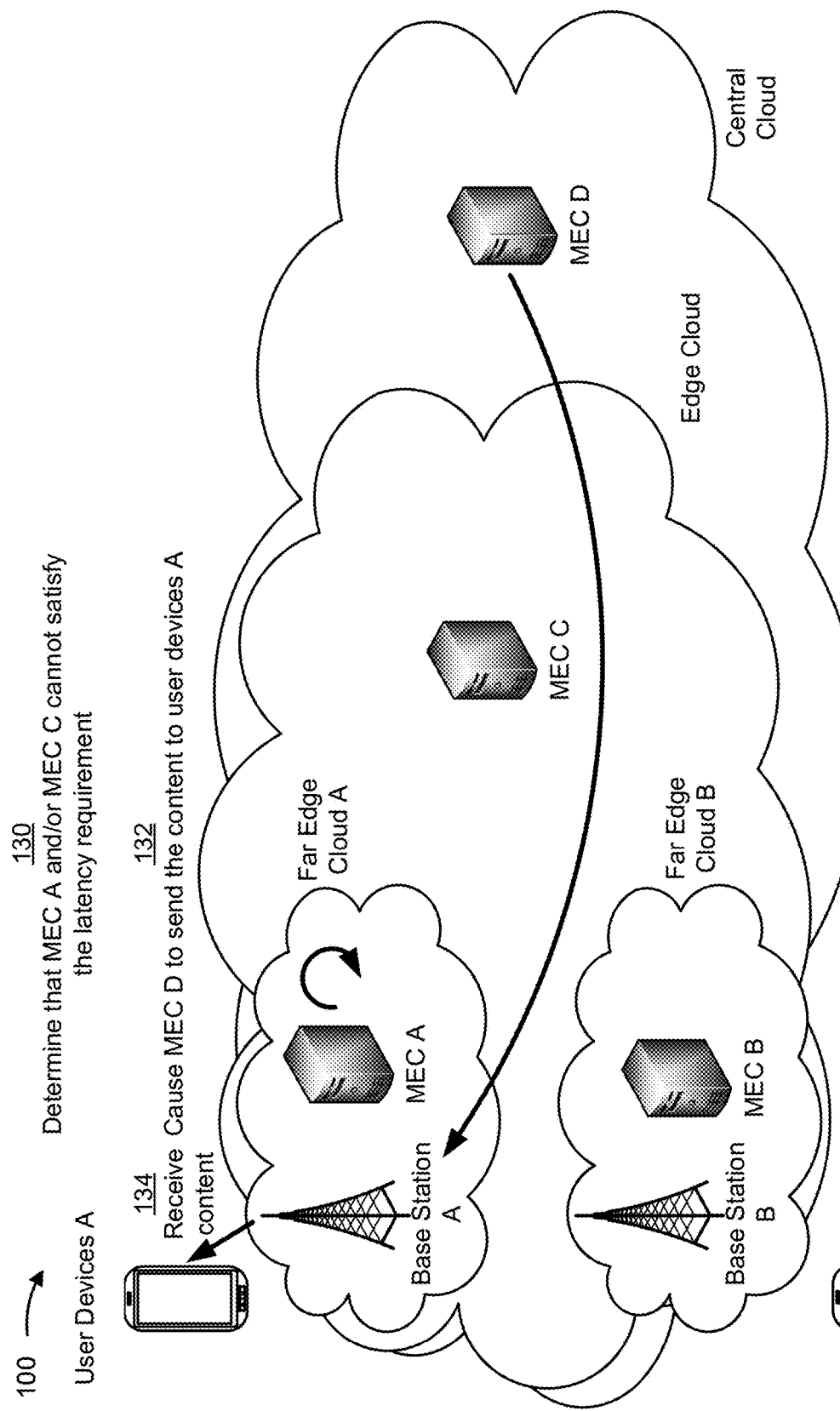

Accordingly, as shown in FIG. 1G and by reference number 130, MEC device A may determine that MEC device A and/or MEC device C cannot satisfy the latency requirement. As shown by reference number 132, MEC device A can cause MEC device D to send the content to the one or more user devices A. For example, MEC device A can cause MEC device D (e.g., by sending a message to MEC device D) to host the content and/or send the content to the one or more user devices A (e.g., as a multicast or broadcast transmission) when MEC device A and/or MEC device C cannot satisfy the latency requirement. MEC device D may send the content to the one or more user devices A via base station A. As shown by reference number 134, the one or more user devices A may receive the content from MEC device D via base station A.

While some implementations described herein concern MEC device A determining a latency requirement and determining whether MEC device A and/or MEC device C can satisfy the latency requirement, additional implementations are contemplated concerning other requirements. For example, MEC device A may determine a resource requirement (e.g., an amount of processing resources, memory resources, power resources, networking resources, and/or the like) for hosting content. MEC device A may determine whether MEC device A and/or MEC device C can satisfy the resource requirement (e.g., determine whether MEC device A and/or MEC device C each have enough available processing resources, memory resources, power resources, networking resources, and/or the like) to host the content using a similar process as described herein in relation to FIGS. 1E and 1F. Accordingly, based on determining whether MEC device A and/or MEC device C can satisfy the resource requirement, MEC device A may cause MEC device A, MEC device C, or MEC device D to host the content using a similar process as described herein in relation to FIGS. 1E, 1F, and 1G.

Figure 1H:
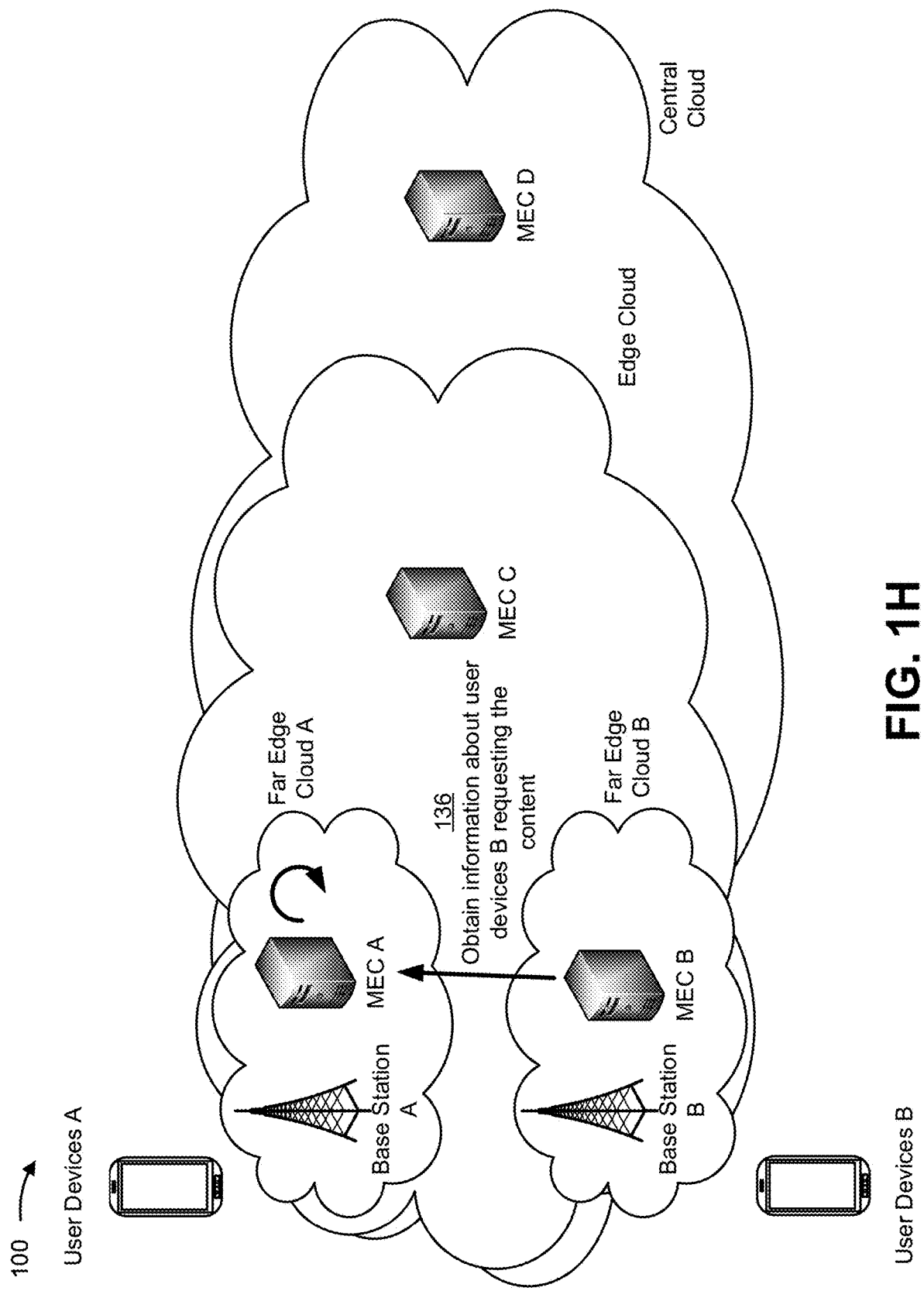

Additionally, or alternatively, as shown in FIG. 1H and reference number 136, MEC device A may obtain information about user devices B requesting the content. For example, MEC device A may obtain the information from MEC device B (e.g., MEC device B may send the information to MEC device A, MEC device A may query MEC device B for the information, and/or the like). MEC device A may obtain the information after MEC device A determines that MEC device A cannot satisfy the latency requirement.

In some implementations, after obtaining the information, MEC device A may determine a total number of the one or more user devices B. For example, MEC device A may process the information to determine the total number of the one or more user devices B. In some implementations, MEC device A may determine whether the total number of the one or more user devices B satisfies the threshold (e.g., whether the total number of the one or more user devices B is greater than or equal to the threshold).

Figure 1I:
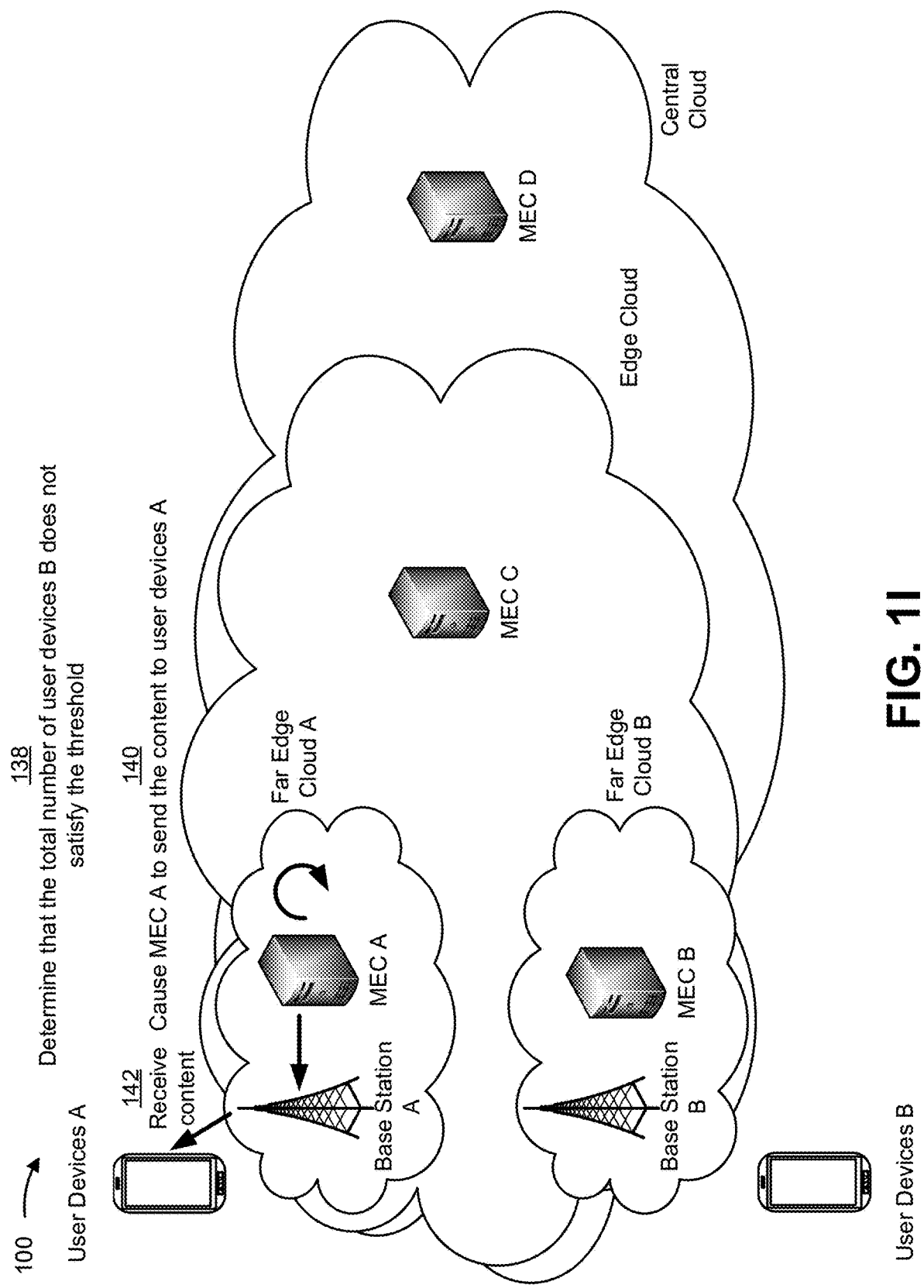

As shown in FIG. 1I and by reference number 138, MEC device A may determine that the total number of one or more user devices B does not satisfy the threshold (e.g., the total number of the one or more user devices B is less than the threshold). As shown by reference number 140, MEC device A, based on determining that the total number of one or more user devices B does not satisfy the threshold, may cause MEC device A to send the content to the one or more user devices A. For example, MEC device A may send the content (e.g., as a multicast or broadcast transmission) to the one or more user devices A via base station A. As shown by reference number 142, the one or more user devices A may receive the content from MEC device A via base station A.

Figure 1J:
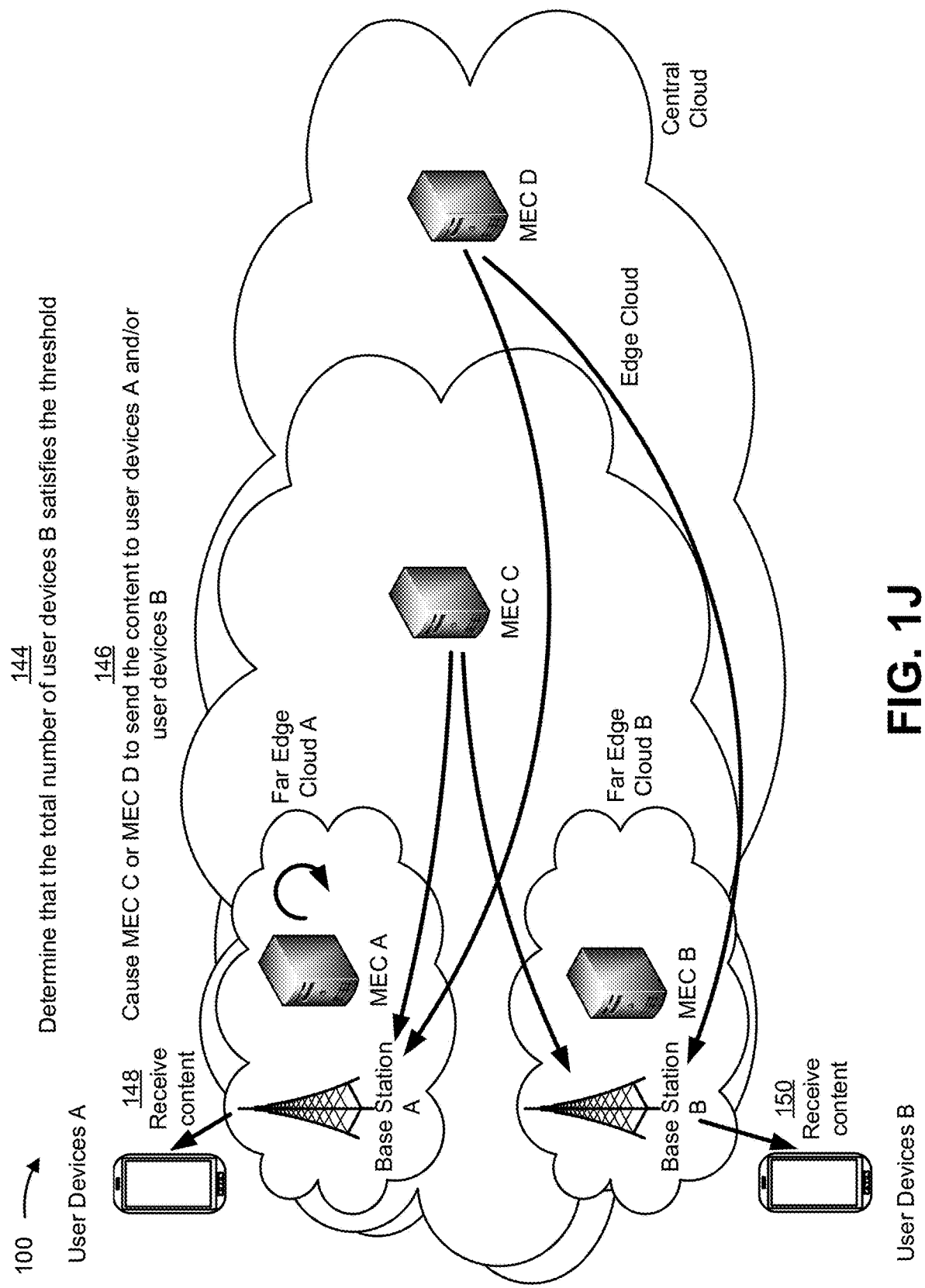

Additionally, or alternatively, as shown in FIG. 1J and by reference number 144, MEC device A may determine that the total number of one or more user devices B satisfies the threshold (e.g., the total number of the one or more user devices B is greater than or equal to the threshold). As shown by reference number 146, MEC device A, based on determining that the total number of one or more user devices B satisfies the threshold, may cause MEC device C or MEC device D to send the content (e.g., as a multicast or broadcast transmission) to the one or more user devices A and/or the one or more user devices B. For example, in a similar manner as described herein in relation to FIG. 1F, MEC device A may determine a latency capability of MEC device C (e.g., by communicating with MEC device C) and may determine, based on the latency capability of MEC device C, whether MEC device C can satisfy the latency requirement. In some implementations, when MEC device A may determine that MEC device C can satisfy the latency requirement, MEC device A may cause MEC device C to send the content (e.g., as a multicast or broadcast transmission) to the one or more user devices A and/or the one or more user devices B. In some implementations, when MEC device A may determine that MEC device C cannot satisfy the latency requirement, MEC device A may cause MEC device D to send the content (e.g., as a multicast or broadcast transmission) to the one or more user devices A and/or the one or more user devices B.

MEC device C and/or MEC device D may send the content to the one or more user devices A via base station A. Additionally, or alternatively, MEC device C and/or MEC device D may send the content to the one or more user devices B via base station B. As shown by reference number 148, the one or more user devices A may receive the content from MEC device C and/or MEC device D via base station A. As shown by reference number 150, the one or more user devices B may receive the content from MEC device C and/or MEC device D via base station B.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of example implementation 100 may perform one or more functions described as being performed by another set of devices of example implementation 100.

Figure 2:
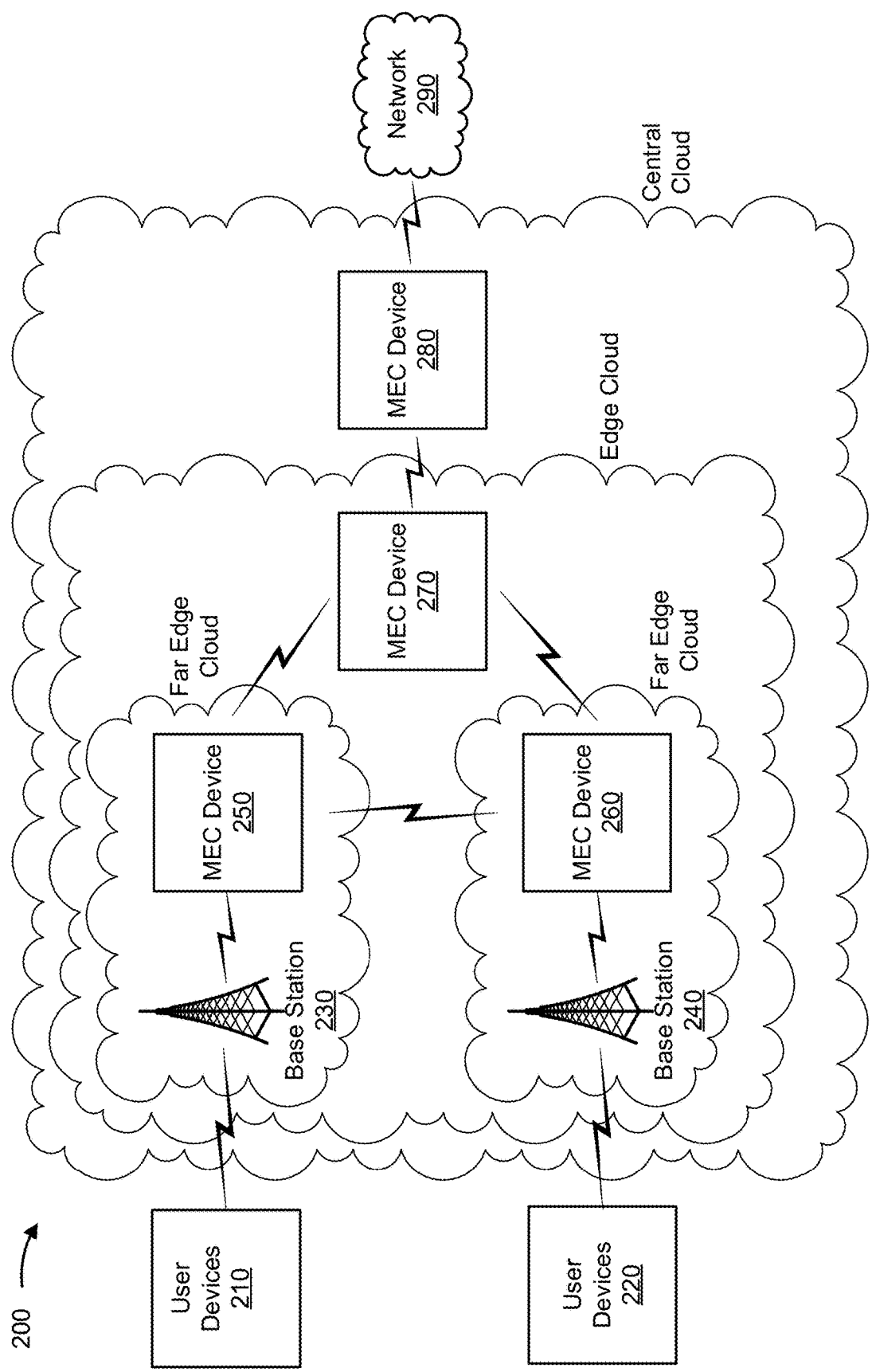
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a user device 220, a base station 230, a base station 240, a MEC device 250, a MEC device 260, a MEC device 270, a MEC device 280, and/or a network 290. Devices of environment 200 may interconnect via wired connections, wireless connections, or a combination of wired and wireless connections. Some implementations may be performed in association with a wireless communication network, such as a third generation (3G) network, a long term evolution (LTE) network, a fifth generation (5G) network, and/or the like.

Environment 200 may include one or more far edge clouds, an edge cloud, and/or a central cloud. A cloud may represent a computing environment where a MEC device associated with the cloud may provide services (e.g., deploy applications, store and process content, and or the like) for one or more user devices. A cloud may be associated with an area that encompasses a base station and a MEC device. For example, a far edge cloud may be associated with an area around a base station (e.g., base station 230 and/or base station 240) and/or a MEC device (e.g., MEC device 250 and/or MEC device 260) where the base station and the MEC device are physically near each other. As another example, the central cloud may be associated with an area around a base station (e.g., base station 230 and/or base station 240) and/or a MEC device (e.g. MEC device 280) where the base station and MEC device are physically far from each other. In another example, the edge cloud may be associated with an area around a base station (e.g., base station 230 and/or base station 240) and/or a MEC device (e.g. MEC device 270) where the MEC device is physically farther from the base station than the MEC device associated with the far edge cloud and the MEC device is physically nearer the base station than the MEC device associated with the central cloud.

In some implementations, a first far edge cloud may be associated with base station 230 and/or MEC device 250. A second far edge cloud may be associated with base station 240 and/or MEC device 260. The edge cloud may be associated with base station 230, base station 240, and/or MEC device 270. The central cloud may be associated with base station 230, base station 240, and/or MEC device 280.

User devices 210 include one or more devices capable of communicating with base station 230, a MEC device (e.g., MEC device 250, MEC device 270, and/or MEC device 280), and/or a network (e.g., network 290). For example, a user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. User device 210 may be capable of communicating using uplink (e.g., user device to base station) communications, downlink (e.g., base station to user device) communications, and/or side link (e.g., user device to user device) communications.

User devices 220 include one or more devices capable of communicating with base station 240, a MEC device (e.g., MEC device 260, MEC device 270, and/or MEC device 280), and/or a network (e.g., network 290). For example, a user device 220 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. User device 220 may be capable of communicating using uplink (e.g., user device to base station) communications, downlink (e.g., base station to user device) communications, and/or side link (e.g., user device to user device) communications.

Base station 230 includes one or more devices capable of communicating with one or more user devices 210 using a cellular Radio Access Technology (RAT). For example, base station 230 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 230 may transfer traffic between a user device 210 (e.g., using a cellular RAT), a MEC device (e.g., MEC device 250, MEC device 270, MEC device 280, and/or the like), and/or network 290. Base station 230 may provide one or more cells that cover geographic areas. Base station 230 may be a mobile base station. Base station 230 may be capable of communicating using multiple RATs.

Base station 240 includes one or more devices capable of communicating with one or more user devices 220 using a cellular Radio Access Technology (RAT). For example, base station 240 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 240 may transfer traffic between a user device 220 (e.g., using a cellular RAT), a MEC device (e.g., MEC device 260, MEC device 270, MEC device 280, and/or the like), and/or network 290. Base station 240 may provide one or more cells that cover geographic areas. Base station 240 may be a mobile base station. Base station 240 may be capable of communicating using multiple RATs.

MEC device 250 includes one or more devices capable of hosting and/or sending content to user devices 210. For example, MEC device 250 may include a server device, a group of server devices, a desktop computer, a laptop computer, a multicast and broadcast function device (MCBC), and/or a similar type of device. In some implementations, MEC device 250 may selectively cause MEC device 250, MEC device 270, and/or MEC device 280 to send content to user devices 210 and/or user devices 220. In some implementations, MEC device 250 may be hosted as part of base station 230 or at a site associated with base station 230. In some implementations, MEC device 250 may be hosted within a far edge cloud.

MEC device 260 includes one or more devices capable of hosting and/or sending content to user devices 220. For example, MEC device 260 may include a server device, a group of server devices, a desktop computer, a laptop computer, a multicast and broadcast function device (MCBC), and/or a similar type of device. In some implementations, MEC device 260 may send information related to user devices 220 requesting access to the content. In some implementations, MEC device 260 may be hosted as part of base station 240 or at a site associated with base station 240. In some implementations, MEC device 260 may be hosted within a far edge cloud.

MEC device 270 includes one or more devices capable of hosting and/or sending content to user devices 210 and/or user devices 220. For example, MEC device 270 may include a server device, a group of server devices, a desktop computer, a laptop computer, a multicast and broadcast function device (MCBC), and/or a similar type of device. In some implementations, MEC device 250 may cause MEC device 270 to send content to user devices 210 and/or user devices 220. In some implementations, MEC device 270 may be hosted within an edge cloud.

MEC device 280 includes one or more devices capable of hosting and/or sending content to user devices 210 and/or user devices 220. For example, MEC device 280 may include a server device, a group of server devices, a desktop computer, a laptop computer, a multicast and broadcast function device (MCBC), and/or a similar type of device. In some implementations, MEC device 250 may cause MEC device 280 to send content to user devices 210 and/or user devices 220. In some implementations, MEC device 280 may be hosted within a central cloud.

Network 290 includes one or more wired and/or wireless networks. For example, network 290 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
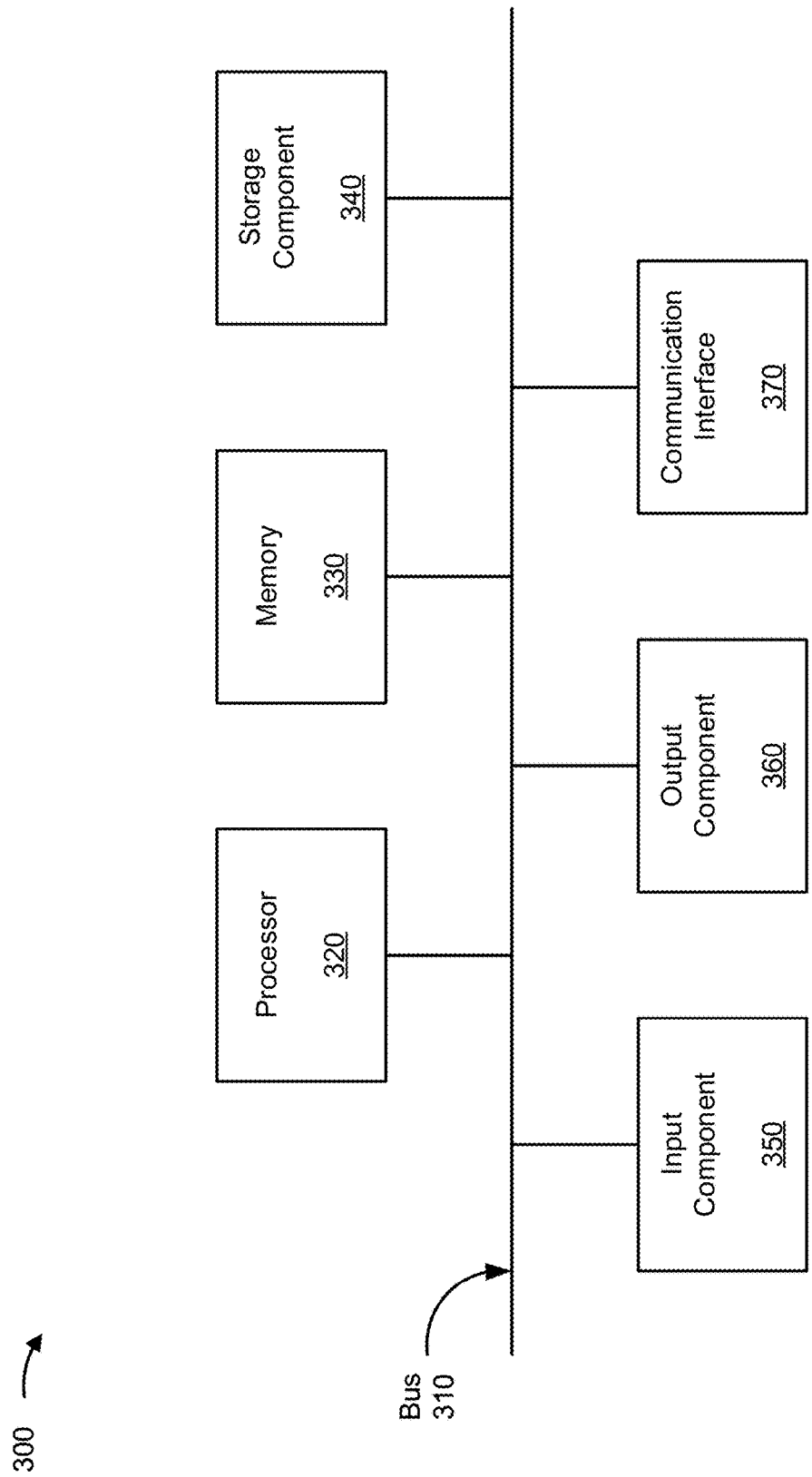
FIG. 3 is a diagram of example components of one or more devices of FIG. 2.

FIG. 3 is a diagram of example components of a device 300. Device 300 may correspond to user devices 210, user devices 220, base station 230, base station 240, MEC device 250, MEC device 260, MEC device 270, and/or MEC device 280. In some implementations user devices 210, user devices 220, base station 230, base station 240, MEC device 250, MEC device 260, MEC device 270, and/or MEC device 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for facilitating delivery of multicast or broadcast content in a multi-access edge computing (MEC) environment. In some implementations, one or more process blocks of FIG. 4 may be performed by an edge device (e.g., MEC device 250). In some implementations, one or more process blocks of FIG. 4 may be performed by another device or a group of devices separate from or including the edge device, such as a user device (e.g., user device 210 and/or user device 220), a base station (e.g., base station 230 and/or base station 240), another edge device (e.g., MEC device 260, MEC device 270, and/or MEC device 280), and/or the like.

As shown in FIG. 4, process 400 may include obtaining, via a base station, one or more respective requests from one or more user devices to access content (block 405). For example, the edge device (e.g., using processor 320, memory 330, storage component 340, input component 350, output component 360, communication interface 370 and/or the like) may obtain, via a base station, one or more respective requests from one or more user devices to access content, as described above. The content may be multicast content, broadcast content, time synchronized content, and/or the like.

As further shown in FIG. 4, process 400 may include determining a total number of the one or more user devices (block 410). For example, the edge device (e.g., using processor 320, memory 330, storage component 340, input component 350, output component 360, communication interface 370 and/or the like) may determine a total number of the one or more user devices, as described above.

As further shown in FIG. 4, process 400 may include determining that the total number of the one or more user devices satisfies a threshold (block 415). For example, the edge device (e.g., using processor 320, memory 330, storage component 340, input component 350, output component 360, communication interface 370 and/or the like) may determine that the total number of the one or more user devices satisfies a threshold, as described above. The edge device may send, based on determining that the total number of the one or more user devices satisfies the threshold, a message to a first different edge device or a second different edge device indicating that the edge device is multicast or broadcast enabled. In some implementations, the edge device may determine a multicast or broadcast hosting efficiency requirement of the edge device and may determine the threshold based on the multicast or broadcast hosting efficiency requirement of the edge device.

As further shown in FIG. 4, process 400 may include determining, based on the total number of the one or more user devices satisfying the threshold, a latency requirement associated with the content (block 420). For example, the edge device (e.g., using processor 320, memory 330, storage component 340, input component 350, output component 360, communication interface 370 and/or the like) may determine, based on the total number of the one or more user devices satisfying the threshold, a latency requirement associated with the content, as described above. In some implementations, the edge device may determine a type of the content and determine, based on the type of the content, the latency requirement.

As further shown in FIG. 4, process 400 may include determining whether the edge device or a first different edge device can satisfy the latency requirement (block 425). For example, the edge device (e.g., using processor 320, memory 330, storage component 340, input component 350, output component 360, communication interface 370 and/or the like) may determine whether the edge device or a first different edge device can satisfy the latency requirement, as described above. As another example, the edge device may determine a latency capability of the edge device and may determine, based on the latency capability of the edge device, that the edge device can or cannot satisfy the latency requirement. In another example, the edge device may determine, based on the latency capability of the edge device, that the edge device cannot satisfy the latency requirement; may determine, based on determining that the edge device cannot satisfy the latency requirement, a latency capability of the first different edge device; and may determine, based on the latency capability of the first different edge device, that the different first edge device can or cannot satisfy the latency requirement.

As further shown in FIG. 4, process 400 may include selectively causing, based on determining whether the edge device or the first different edge device can satisfy the latency requirement, the edge device, the first different edge device, or a second different edge device to send the content to the one or more user devices via the base station (block 430). For example, the edge device (e.g., using processor 320, memory 330, storage component 340, input component 350, output component 360, communication interface 370 and/or the like) may selectively cause, based on determining whether the edge device or the first different edge device can satisfy the latency requirement, the edge device, the first different edge device, or a second different edge device to send the content to the one or more user devices via the base station, as described above. For example, the edge device may be caused to send the content to the one or more user devices when the edge device can satisfy the latency requirement; the first different edge device may be caused to send the content to the one or more user devices when the first different edge device can satisfy the latency requirement; or the second different edge device may be caused to send the content to the one or more user devices when the edge device and the first different edge device cannot satisfy the latency requirement.

Process 400 may include additional implementations, such as any single implementation or any combination of implementations described below and/or in connection with one or more other processes described elsewhere herein.

In some implementations, the edge device may be associated with a first far edge cloud, the first different edge device may be associated with an edge cloud, and the second different edge device may be associated with a central cloud. The base station may be associated with the first far edge cloud, the edge cloud, and the central cloud and/or the different base station may be associated with a second far edge cloud, the edge cloud, and the central cloud. The base station may be associated with the edge device, the first different edge device, and the second different edge device. The different base station may be associated with the first different edge device and the second different edge device.

In some implementations, after determining that the edge device cannot satisfy the latency requirement, the edge device may obtain information related to one or more different user devices requesting access to the content, wherein the one or more different user devices are associated with a different base station. The edge device may determine a total number of the one or more different user devices and may determine whether the total number of the one or more different user devices satisfies the threshold. The edge device may selectively cause, based on determining whether the total number of the one or more different user devices satisfies the threshold, the edge device, the first different edge device, or the second different edge device to send the content to the one or more user devices via the base station.

For example, the edge device may cause, based on the total number of the one or more different user devices not satisfying the threshold, the edge device to send the content to the one or more user devices. As another example, the edge device may determine, based on determining that the total number of the one or more different user devices satisfies the threshold, a latency capability of the first different edge device and may determine, based on the latency capability of the first different edge device, whether the first different edge device can satisfy the latency requirement. The edge device may cause, based on determining that the first different edge device can satisfy the latency requirement, the first different edge device to send the content to the one or more user devices. Additionally, or alternatively, the edge device may cause, based on determining that the first different edge device cannot satisfy the latency requirement, the second different edge device to send the content to the one or more user devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by an edge device and via a base station, one or more respective requests from one or more user devices to access content;
   determining, by the edge device, a total number of the one or more user devices; determining, by the edge device, that the total number of the one or more user devices satisfies a threshold;
   determining, by the edge device and based on the total number of the one or more user devices satisfying the threshold, a latency requirement associated with the content;
   determining, by the edge device, whether the edge device can satisfy the latency requirement;
   obtaining, by the edge device, information related to one or more different user devices requesting access to the content,
      wherein the one or more different user devices are associated with a different base station;
   determining, by the edge device, a total number of the one or more different user devices;
   determining, by the edge device, whether the total number of the one or more different user devices satisfies the threshold; and
   selectively causing, by the edge device and based on determining whether the edge device can satisfy the latency requirement and based on determining whether the total number of the one or more different user devices satisfies the threshold, the edge device or a different edge device to send the content to the one or more user devices via the base station,
      wherein the edge device is caused to send the content to the one or more user devices when the edge device can satisfy the latency requirement, or
      wherein a first different edge device or a second different edge device is caused to send the content to the one or more user devices when the edge device cannot satisfy the latency requirement,
   wherein the base station is associated with a first far edge cloud, an edge cloud, and a central cloud,
   wherein the different base station is associated with a second far edge cloud, the edge cloud, and the central cloud,
   wherein the edge device is associated with the first far edge cloud,
   wherein the first different edge device is associated with the edge cloud, and
   wherein the second different edge device is associated with the central cloud.

2. The method of claim 1, wherein the content is multicast content or broadcast content.

3. The method of claim 1, wherein determining the latency requirement associated with the content comprises:
   determining a type of the content; and
   determining, based on the type of the content, the latency requirement.

4. The method of claim 1, wherein determining whether the edge device can satisfy the latency requirement comprises:
   determining a latency capability of the edge device; and
   determining, based on the latency capability of the edge device, that the edge device can satisfy the latency requirement.

5. The method of claim 1, wherein determining whether the edge device can satisfy the latency requirement comprises:
   determining a latency capability of the edge device;
   determining, based on the latency capability of the edge device, that the edge device cannot satisfy the latency requirement;
   determining, based on determining that the edge device cannot satisfy the latency requirement, a latency capability of the different edge device; and
   determining, based on the latency capability of the different edge device, that the different edge device can satisfy the latency requirement.

6. The method of claim 1, further comprising:
   determining that the content is live streaming video content or public safety content; and
   wherein determining the latency requirement associated with the content comprises:
      determining a live streaming video content latency requirement associated with the live streaming video content and a public safety content latency requirement associated with the public safety content,
         wherein the live streaming video content latency requirement is different from the public safety content latency requirement.

7. An edge device, comprising:
   one or more memories; and
   one or more processors, communicatively coupled to the one or more memories, to:
      obtain, via a base station, one or more respective requests from one or more user devices to access content;
      determine a total number of the one or more user devices;
      determine that the total number of the one or more user devices satisfies a threshold;

determine, based on the total number of the one or more user devices satisfying the threshold, a latency requirement associated with the content;

determine whether the edge device or a first different edge device can satisfy the latency requirement;

obtain information related to one or more different user devices requesting access to the content, wherein the one or more different user devices are associated with a different base station;

determine a total number of the one or more different user devices;

determine whether the total number of the one or more different user devices satisfies the threshold; and selectively cause, based on determining whether the edge device or the first different edge device can satisfy the latency requirement and based on determining whether the total number of the one or more different user devices satisfies the threshold, the edge device, the first different edge device, or a second different edge device to send the content to the one or more user devices via the base station, wherein the edge device is caused to send the content to the one or more user devices when the edge device can satisfy the latency requirement, wherein the first different edge device is caused to send the content to the one or more user devices when the first different edge device can satisfy the latency requirement, or wherein the second different edge device is caused to send the content to the one or more user devices when the edge device and the first different edge device cannot satisfy the latency requirement, wherein the base station is associated with a first far edge cloud, an edge cloud, and a central cloud, wherein the different base station is associated with a second far edge cloud, the edge cloud, and the central cloud, wherein the edge device is associated with the first far edge cloud, wherein the first different edge device is associated with the edge cloud, and wherein the second different edge device is associated with the central cloud.

8. The edge device of claim 7, wherein the content is time synchronized content.

9. The edge device of claim 7, wherein the one or more processors are further to:

determine a multicast or broadcast hosting efficiency requirement of the edge device; and determine the threshold based on the multicast or broadcast hosting efficiency requirement of the edge device.

10. The edge device of claim 7, wherein the one or more processors, when determining that the total number of the one or more user devices satisfies the threshold, are to:

send a message to the first different edge device or the second different edge device indicating that the edge device is multicast or broadcast enabled.

11. The edge device of claim 7, wherein the one or more processors, when determining whether the edge device or the first different edge device can satisfy the latency requirement, are to:

determine a latency capability of the edge device; and determine, based on the latency capability of the edge device, that the edge device can satisfy the latency requirement.

12. The edge device of claim 7, wherein the one or more processors, when determining whether the edge device or the first different edge device can satisfy the latency requirement, are to:

determine a latency capability of the edge device;

determine, based on the latency capability of the edge device, that the edge device cannot satisfy the latency requirement;

determine, based on determining that the edge device cannot satisfy the latency requirement, a latency capability of the first different edge device; and determine, based on the latency capability of the first different edge device, that the first different edge device can satisfy the latency requirement.

13. The edge device of claim 7, wherein the one or more processors, when determining whether the edge device or the first different edge device can satisfy the latency requirement, are to:

determine a latency capability of the edge device;

determine, based on the latency capability of the edge device, that the edge device cannot satisfy the latency requirement;

determine, based on determining that the edge device cannot satisfy the latency requirement, a latency capability of the first different edge device; and determine, based on the latency capability of the first different edge device, that the first different edge device cannot satisfy the latency requirement.

14. The edge device of claim 7, wherein the one or more processors are further to:

determine that the content is live streaming video content or public safety content; and wherein the one or more processors, when determining the latency requirement associated with the content, are to:

determine a live streaming video content latency requirement associated with the live streaming video content and a public safety content latency requirement associated with the public safety content, wherein the live streaming video content latency requirement is different from the public safety content latency requirement.

15. A non-transitory computer-readable medium storing instructions, the instructions comprising:

one or more instructions that, when executed by one or more processors of an edge device, cause the one or more processors to:

obtain, via a base station, one or more respective requests from one or more user devices to access content;

determine a total number of the one or more user devices;

determine that the total number of the one or more user devices satisfies a threshold;

determine that the edge device cannot satisfy a latency requirement associated with the content;

obtain information related to one or more different user devices requesting access to the content, wherein the one or more different user devices are associated with a different base station;

determine a total number of the one or more different user devices;

determine whether the total number of the one or more different user devices satisfies the threshold; and selectively cause, based on determining whether the total number of the one or more different user devices satisfies the threshold, the edge device, a first different edge device, or a second different edge device to send the content to the one or more user devices via the base station,
wherein:
the base station is associated with a first far edge cloud, an edge cloud, and a central cloud,
the different base station is associated with a second far edge cloud, the edge cloud, and the central cloud,
the edge device is associated with the first far edge cloud,
the first different edge device is associated with the edge cloud, and
the second different edge device is associated with the central cloud.

16. The non-transitory computer-readable medium of claim 15, wherein:
the base station is associated with the edge device, the first different edge device, and the second different edge device; and
the different base station is associated with the first different edge device and the second different edge device.

17. The non-transitory computer-readable medium of claim 15, wherein the one or more instructions, that cause the one or more processors to determine whether the total number of the one or more different user devices satisfies the threshold, cause the one or more processors to:
determine that the total number of the one or more different user devices does not satisfy the threshold,
wherein the one or more instructions, that cause the one or more processors to selectively cause the edge device, the first different edge device, or the second different edge device to send the content to the one or more user devices via the base station, cause the one or more processors to:
cause, based on the total number of the one or more different user devices not satisfying the threshold, the edge device to send the content to the one or more user devices.

18. The non-transitory computer-readable medium of claim 15, wherein the one or more instructions, that cause the one or more processors to determine whether the total number of the one or more different user devices satisfies the threshold, cause the one or more processors to:
determine that the total number of the one or more different user devices satisfies the threshold,
wherein the one or more instructions, that cause the one or more processors to selectively cause the edge device, the first different edge device, or the second different edge device to send the content to the one or more user devices via the base station, cause the one or more processors to:
determine, based on determining that the total number of the one or more different user devices satisfies the threshold, a latency capability of the first different edge device;
determine, based on the latency capability of the first different edge device, that the first different edge device can satisfy the latency requirement; and
cause, based on determining that the first different edge device can satisfy the latency requirement, the first different edge device to send the content to the one or more user devices.

19. The non-transitory computer-readable medium of claim 15, wherein the one or more instructions, that cause the one or more processors to determine whether the total number of the one or more different user devices satisfies the threshold, cause the one or more processors to:
determine that the total number of the one or more different user devices satisfies the threshold,
wherein the one or more instructions, that cause the one or more processors to selectively cause the edge device, the first different edge device, or the second different edge device to send the content to the one or more user devices via the base station, cause the one or more processors to:
determine, based on determining that the total number of the one or more different user devices satisfies the threshold, a latency capability of the first different edge device;
determine, based on the latency capability of the first different edge device, that the first different edge device cannot satisfy the latency requirement; and
cause, based on determining that the first different edge device cannot satisfy the latency requirement, the second different edge device to send the content to the one or more user devices.

20. The non-transitory computer-readable medium of claim 15, wherein the one or more instructions, when executed by the one or more processors, further cause the one or more processors to:
determine that the content is live streaming video content or public safety content; and
wherein the one or more instructions, that cause the one or more processors to determine that the content is live streaming video content or public safety content, cause the one or more processors to:
determine a live streaming video content latency requirement associated with the live streaming video content and a public safety content latency requirement associated with the public safety content,
wherein the live streaming video content latency requirement is different from the public safety content latency requirement.

* * * * *